US011316980B2

(12) United States Patent
Richards et al.

(10) Patent No.: US 11,316,980 B2
(45) Date of Patent: Apr. 26, 2022

(54) AGENT TO BOT TRANSFER (71) Applicant: INTERNATIONAL BUSINESS MACHINES CORPORATION, Armonk, NY (US)

(72) Inventors: John Thomas Richards, Honeoye Falls, NY (US); Rachel Katherine Emma Bellamy, Bedford, NY (US); Robert G. Farrell, Cornwall, NY (US); Qingzi Liao, White Plains, NY (US); David John Piorkowski, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/695,401

(22) Filed: Nov. 26, 2019

(65) Prior Publication Data

US 2021/0160374 A1 May 27, 2021

(51) Int. Cl.
*H04M 3/00* (2006.01)
*H04M 5/00* (2006.01)
(Continued)

(52) U.S. Cl.
CPC ....... *H04M 3/5237* (2013.01); *H04M 3/5175* (2013.01); *H04M 3/5183* (2013.01); *H04M 3/5233* (2013.01)

(58) Field of Classification Search
CPC ............. H04M 3/5175; H04M 3/5166; H04M 3/5191; H04M 3/58; H04M 3/5232;
(Continued)

(56) References Cited

U.S. PATENT DOCUMENTS 931,384 A 8/1909 Cheney
6,931,384 B1 8/2005 Horvitz
(Continued)

FOREIGN PATENT DOCUMENTS

KR 20190036604 A 4/2019

OTHER PUBLICATIONS

Gregori, "Evaluation of Modern Tools for an OMSCS Advisor Chatbot", Georgia Tech, https://smartech.gatech.edu/handle/1853/58516, Aug. 2018, pp. 1-51.
(Continued)

*Primary Examiner* — Kharye Pope
(74) *Attorney, Agent, or Firm* — John Noh (57) ABSTRACT

A method, a computer program product, and a computer system determine when to transfer a communication session from an agent to a bot. The method includes monitoring the communication session between the agent and a user. The method includes determining a continuing utility value indicating a predicted continuing cost to maintaining the communication session with the agent. The continuing utility value is indicative of a predicted continuing benefit to maintaining the communication with the agent. The method includes determining a transferring utility value indicating a predicted transferring cost to transferring the communication session from the agent to the bot. The transferring utility value is indicative of a predicted transferring benefit to transferring the communication session from the agent to the bot. The method includes, as a result of the predicted transferring benefit being greater than the predicted continuing benefit, transferring the communication session from the agent to the bot.

20 Claims, 5 Drawing Sheets (51) Int. Cl.
*H04L 12/66* (2006.01)
*H04M 3/523* (2006.01)
*H04M 3/51* (2006.01)

(58) Field of Classification Search
CPC ....... H04M 2203/402; H04M 2201/42; H04M 3/5133; H04M 3/5183; H04M 3/523; H04M 3/50; H04M 7/0045; H04M 3/5233; H04M 3/54; H04M 15/56; H04M 15/8044; H04M 2203/357; H04M 2203/404; H04M 2203/406; H04M 3/4217; H04M 3/5141; G06Q 10/10; G06Q 10/0631; G06Q 10/06311; G06Q 10/06315; G06Q 30/016; G06Q 10/06316; G06Q 10/0633; G06Q 10/101; G06Q 10/103; H04L 51/02; H04L 51/046; H04L 51/24; H04L 65/1093; H04L 43/08; G10L 15/22; G10L 15/30; G10L 15/26; G10L 2015/228; G10L 21/10; G10L 25/63; G10L 2015/226
USPC .............. 379/265.09, 88.01, 265.11, 265.02, 379/201.01, 212.01, 265.01, 265.06, 379/265.12, 265.14; 370/352
See application file for complete search history.

(56) References Cited

U.S. PATENT DOCUMENTS

| | | | | |
|---|---|---|---|---|
| 8,379,830 | B1* | 2/2013 | Naik | H04M 3/493 379/265.02 |
| 8,649,500 | B1 | 2/2014 | Cohen | |
| 9,955,021 | B1* | 4/2018 | Liu | H04M 3/5232 |
| 10,554,817 | B1* | 2/2020 | Sullivan | G06N 5/02 |
| 10,630,840 | B1* | 4/2020 | Karp | G06F 9/547 |
| 2004/0054743 | A1* | 3/2004 | McPartlan | H04M 3/5235 709/206 |
| 2004/0230684 | A1 | 11/2004 | Smolinski | |
| 2004/0264677 | A1 | 12/2004 | Horvitz et al. | |
| 2005/0105712 | A1* | 5/2005 | Williams | H04M 3/5166 379/265.02 |
| 2007/0043571 | A1 | 2/2007 | Michelini | |
| 2008/0046386 | A1 | 2/2008 | Pieraccinii | |
| 2008/0147406 | A1* | 6/2008 | Da Palma | G10L 15/22 704/260 |
| 2008/0260128 | A1* | 10/2008 | Conway | H04M 3/5232 379/201.02 |
| 2009/0171729 | A1* | 7/2009 | Anisimov | G06Q 10/10 705/7.27 |
| 2011/0051918 | A1* | 3/2011 | Fan | H04M 3/5166 379/211.02 |
| 2016/0028891 | A1* | 1/2016 | Pirat | H04M 3/5183 379/88.01 |
| 2016/0036983 | A1* | 2/2016 | Korolev | H04M 3/5233 379/265.12 |
| 2016/0065738 | A1* | 3/2016 | Schwartz | H04M 3/4217 379/265.03 |
| 2016/0295018 | A1* | 10/2016 | Loftus | H04M 3/2281 |
| 2017/0324868 | A1* | 11/2017 | Tamblyn | G06Q 10/06316 |
| 2018/0091647 | A1* | 3/2018 | Elizondo | G06Q 10/06316 |
| 2019/0180288 | A1* | 6/2019 | Shaev | G06Q 30/016 |
| 2020/0169636 | A1* | 5/2020 | Hillier | H04M 3/5183 |

OTHER PUBLICATIONS

Liao et al, "All Work and no Play? Conversations with a Question-and-Answer Chatbot in the Wild", CHI 2018, Apr. 21-26, 2018, Montreal, QB, Canada, pp. 1-13.

Mell et al., "The NIST Definition of Cloud Computing", National Institute of Standards and Technology, Special Publication 800-145, Sep. 2011, pp. 1-7.

Paek et al., "Conversation as Action Under Uncertainty", Uncertainty in Artificial Intellegence Proceedings 2000, pp. 455-464.

Traum et al., "Embodied Agents for Multi-party Dialogue in Immersive Virtual Worlds", ACM Digital Library, https://dl.acm.org/citation.cfm?id=544922, 2002, pp. 1-9.

* cited by examiner

AGENT TO BOT TRANSFER

BACKGROUND

The exemplary embodiments relate generally to contact centers, and more particularly to determining when to transfer a communication session from an agent to a bot.

A contact center may be associated with a product and/or service provider. The contact center may provide a resource for users or consumers of respective products and services to address tasks, queries, issues, ordering, account review, etc. related to the product and/or service. The contact center may have a variety of cost considerations in providing the resource. For example, the contact center may employ agents who manually process incoming communication sessions with users. The contact center may also utilize a bot to automatically process communication sessions with users. The communication sessions that are held between the user and the agent may have a cost in terms of time and effort on the part of the user. For example, the user may not have certain information or take a long time to find the necessary information. Meanwhile, bots may be relatively fast and provide precise information but may only be configured to handle a small amount of requests or types of requests. Conventional approaches implemented at the contact center may not detect when the cost is lower in using the bot in terms of increasing a quality of interactions and reducing interaction costs. For example, the conventional approaches may not determine the types of situations in which the use of bots may provide lower costs. Furthermore, in such situations, once the user's communication session has transferred to the agent, the conventional approaches do not typically transfer the communication session back to a bot as the agent will complete the interaction.

SUMMARY

The exemplary embodiments disclose a method, a computer program product, and a computer system for determining when to transfer a communication session from an agent to a bot. The method comprises monitoring the communication session between the agent and a user. The method comprises determining a continuing utility value indicating a predicted continuing cost to maintaining the communication session with the agent. The continuing utility value is indicative of a predicted continuing benefit to maintaining the communication with the agent. The method comprises determining a transferring utility value indicating a predicted transferring cost to transferring the communication session from the agent to the bot. The transferring utility value is indicative of a predicted transferring benefit to transferring the communication session from the agent to the bot. The method comprises, as a result of the predicted transferring benefit being greater than the predicted continuing benefit, transferring the communication session from the agent to the bot.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

The exemplary embodiments are directed to a method, computer program product, and system for determining when to dynamically transfer a communication session from an agent to a bot. As will be described in greater detail herein, the exemplary embodiments may monitor communication sessions being performed at a contact center between an agent and a user. The exemplary embodiments are configured to determine whether to maintain the communication session with the agent or transfer the communication session to a bot based on a progress of the communication session, particularly in view of cost considerations to the contact center. Key benefits of the exemplary embodiments may include minimizing the cost of using agents at the contact center through an increased use of the bot in offsetting this cost and maintaining an efficiency of handling tasks being requested in each communication session. Detailed implementation of the exemplary embodiments follows.

The exemplary embodiments relate to the area of human-human communication session where the first human is a caller or user seeking to complete a task and the other human is an agent (e.g., at a contact center) working to support the user's task completion. The task may encompass any reason for the user to contact the contact center such as queries, issues, ordering, account review, etc. (hereinafter collectively referred to as a "task"). The exemplary embodiments also relate to the area of human-machine communication session where the human is again a user seeking to complete a task and the machine is a conversational bot enabling the user's task to be completed. The exemplary embodiments may be focused on reducing the time and costs associated with completing the user's task by shifting what starts as a user-human communication session to a user-bot communication session. In this manner, the exemplary embodiments may increase an overall efficiency of task completion by seamlessly shifting a communication session that is currently between an agent and a user to one that is between a bot and a user. For example, the exemplary embodiments may enable a bot to perform one or more conversational actions and one or more actions associated with task completion that would otherwise be performed by an agent.

Conventional approaches to determining when to transfer a communication session involve an opposite approach where a communication session that is currently between a bot and a user is transferred so that the communication session continues between an agent and a user. There is a plurality of different conventional mechanisms designed to perform such a transfer. Those skilled in the art will recognize that the bot may handle at least a portion of a communication session with a user. From a customer care perspective, the bot being used may often leave the user dissatisfied. For example, even with advances to bot programming, the bot may often struggle in the early phases of a communication session in which the user attempts to describe the task being requested. As the contact center may address a substantially large number of types of tasks, the bot that initiates the communication session may be responsible with filtering the information being provided and identifying the one or more tasks being requested by the user. If the initial responses from the bot do not drive the user away (e.g., a statistic that is prevalent where a significantly large proportion of communication sessions with bots do not go beyond a single conversational turn), the task completion process may require an agent to step in for the communication session to progress if the communication session is going poorly or if the user explicitly requests an agent.

Accordingly, the exemplary embodiments may provide an approach where an agent may initiate the communication session with the user. Through the agent-first approach, the exemplary embodiments may improve a user's first impression and may make the task completion process more efficient since the agent may be more adept at quickly determining the type of task being requested by the user. Those skilled in the art may appreciate that the agent may also have drawbacks. For example, the agent may be expensive with a high cost to the contact center. The agent may also not be capable of optimally guiding the completion of a task for various reasons (e.g., the agent is unskilled, relatively new, stressed, overworked, tired, etc.). The agent may also find the job to be unsatisfying, especially if the job involves following a script which may lead to an increased turnover, increased training costs, and often under-trained agents. In view of this further consideration in using agents, the exemplary embodiments provide an approach that supplements the agent who begins a communication session with one or more bots that are capable of handling more scripted aspects of the communication session or task completion. By seamlessly shifting form the agent to a bot (and possibly back to the agent or a different agent), the user may be left satisfied with the experience in reaching out to the contact center while also achieving a cost reduction for the contact center.

The exemplary embodiments are directed to monitoring a communication session between an agent and a user and dynamically determining when to transfer the communication session between the agent and the user and continue the communication session between a bot and the user. However, the exemplary embodiments may also be configured to incorporate the one or more mechanisms of transferring the communication session back from the bot to the agent or a different agent should the communication session require such an action.

The exemplary embodiments are described with regard to a contact center and determining when to transfer the communication session with a user from an agent to a bot. However, the exemplary embodiments may be applied and/or modified to various other scenarios involving a transfer from a manual process to an automated process in a variety of different environments. Thus, the exemplary embodiments may monitor a progress of a session to perform a task between a user and a human actor and determine whether the session is to be transferred from the human actor to an automated actor.

Figure 1:
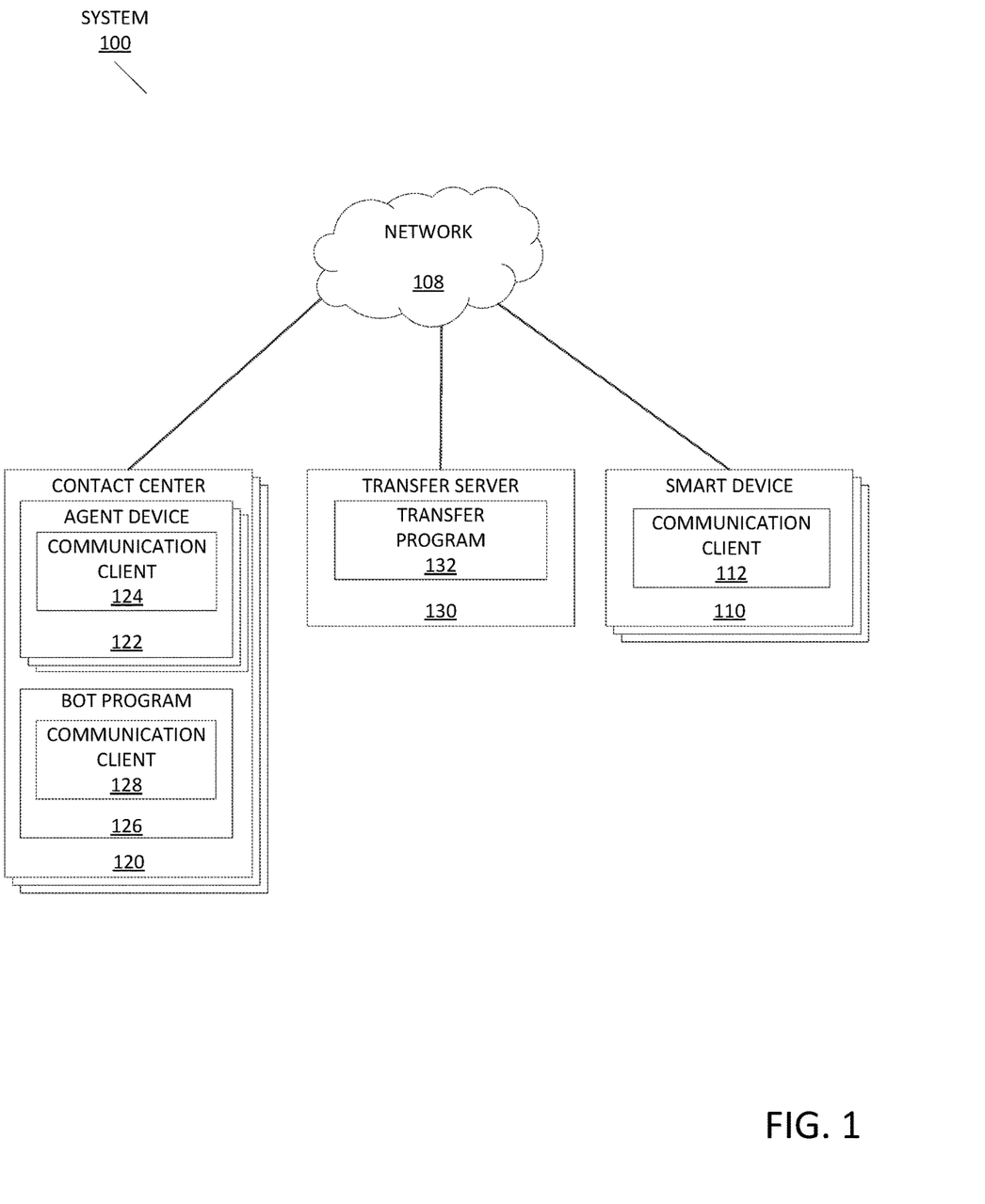
FIG. 1 depicts an exemplary schematic diagram of a communication transfer system 100, in accordance with the exemplary embodiments.

FIG. 1 depicts a communication transfer system 100, in accordance with the exemplary embodiments. According to the exemplary embodiments, the communication transfer system 100 may include one or more smart devices 110, one or more profile contact centers 120, and a transfer server 130, which may all be interconnected via a network 108. While programming and data of the exemplary embodiments may be stored and accessed remotely across several servers via the network 108, programming and data of the exemplary embodiments may alternatively or additionally be stored locally on as few as one physical computing device or amongst other computing devices than those depicted.

In the exemplary embodiments, the network 108 may be a communication channel capable of transferring data between connected devices. Accordingly, the components of the communication transfer system 100 may represent network components or network devices interconnected via the network 108. In the exemplary embodiments, the network 108 may be the Internet, representing a worldwide collection of networks and gateways to support communications between devices connected to the Internet. Moreover, the network 108 may utilize various types of connections such as wired, wireless, fiber optic, etc. which may be implemented as an intranet network, a local area network (LAN), a wide area network (WAN), or a combination thereof. In further embodiments, the network 108 may be a Bluetooth network, a WiFi network, or a combination thereof. In yet further embodiments, the network 108 may be a telecommunications network used to facilitate telephone calls between two or more parties comprising a landline network, a wireless network, a closed network, a satellite network, or a combination thereof. In general, the network 108 may represent any combination of connections and protocols that will support communications between connected devices. For example, the network 108 may also represent direct or indirect wired or wireless connections between the components of the communication transfer system 100 that do not utilize the network 108. In a specific example, the network 108 may include a communication protocol in which communications are exchanged within the contact center 120 (e.g., a private network, a direct communication pathway, etc.).

In the exemplary embodiments, the smart device 110 may include a communication client 112 and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an Internet of Things (IoT) device, or any other electronic device or computing system capable of receiving and sending data to and from other computing devices. While the smart device 110 is shown as a single device, in other embodiments, the smart device 110 may be comprised of a cluster or plurality of computing devices, in a modular manner, etc., working together or working independently. The smart device 110 is described in greater detail as a hardware implementation with reference to FIG. 3, as part of a cloud implementation with reference to FIG. 4, and/or as utilizing functional abstraction layers for processing with reference to FIG. 5.

In the exemplary embodiments, the communication client 112 may act as a client in a client-server relationship and may be a software, hardware, and/or firmware based application utilized by a user wishing to reach the contact center 120 that is capable of establishing and performing a communication session via the network 108. In embodiments, the communication client 112 may operate as a user interface allowing the user of the smart device 110 to interact with one or more components of the communication transfer system 100, and utilize various wired and/or wireless connection protocols for data transmission and exchange associated with establishing and performing a communication session, including Bluetooth, 2.4 gHz and 5 gHz internet, near-field communication, Z-Wave, Zigbee, etc.

The communication client 112 may be configured to allow the user of the smart device 110 to reach the contact center 120. Accordingly, the communication client 112 may establish a communication session and allow the user to communicate with the contact center to resolve a task. The communication client 112 may provide a user interface in which the user enters contact information corresponding to the contact center associated with performing the task. For example, the user may have placed an order for a product being sold by a company associated with the contact center 120. The user may wish to determine a status of the order and when the product will be received by the user. Thus, the task may relate to receiving information regarding a status of the product delivery. When the communication session is a phone call, the user may enter a phone number that reaches the contact center 120 via the interface provided by the communication client 112. The communication client 112 may be configured to establish a variety of types of communication sessions. For example, the communication session may be a text based communication (e.g., a chat session, a text message session, etc.), an audio based communication (e.g., a phone call), a video based communication (e.g., a video call), a web based communication (e.g., a chat session via a web browser interface), etc.

In the exemplary embodiments, the contact center 120 may include one or more agent devices 122 utilized by a respective agent and a bot program 126 and may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of storing, receiving, and sending data to and from other computing devices. While the contact center 120 is shown as a centralized location including the various components, in other embodiments, the contact center 120 may be comprised of a cluster or plurality of electronic devices, in a modular manner, in a remote manner, etc., working together or working independently. The components of the contact center 120 are described in greater detail as a hardware implementation with reference to FIG. 3, as part of a cloud implementation with reference to FIG. 4, and/or as utilizing functional abstraction layers for processing with reference to FIG. 5.

In the exemplary embodiments, the agent device 122 may act as a client in a client-server relationship and may be a software, hardware, and/or firmware based application utilized by an agent communicating with the user of the smart device 110 in the communication session that is established via the network 108. In embodiments, the contact center 120 may determine an available agent and route the communication session to the communication client 124 of the agent device 122. The communication client 124 may operate as a user interface allowing the agent of the agent device 122 to interact with one or more components of the communication transfer system 100, and utilize various wired and/or wireless connection protocols for data transmission and exchange associated with establishing and performing a communication session, including Bluetooth, 2.4 gHz and 5 gHz internet, near-field communication, Z-Wave, Zigbee, etc.

The communication client 124 may be configured to allow the agent of the agent device 122 to exchange communications with the user of the smart device 110 on the other side of the communication session. The communication client 112 may provide a user interface in which the agent may ask questions and/or provide responses to the user of the smart device 110. According to the exemplary embodiments, the contact center 120 may be configured to establish the communication session and be initiated with the agent utilizing the agent device 122. The communication session may be a corresponding type as the one selected to be used by the user of the smart device 110 (e.g., a phone call, a chat session, etc.). In this manner, the contact center 120 may establish the communication session between the agent and the user.

The bot program 126 may act as a client in a client-server relationship and may be a software, hardware, and/or firmware based application that automatically converses with the user of the smart device 110 in the communication session as well as perform various actions in furtherance of completing a task requested by the user of the smart device 110. The bot program 126 may include a communication client 128 that is substantially similar to the communication client 124 of the agent device 122 in establishing and performing a communication session. The communication client 128 may interact with one or more components of the communication transfer system 100, and utilize various wired and/or wireless connection protocols for data transmission and exchange associated with establishing and performing a communication session, including Bluetooth, 2.4 gHz and 5 gHz internet, near-field communication, Z-Wave, Zigbee, etc.

The communication client 128 may be configured with natural language processing components and/or other language processing protocols to determine how to converse with the user of the smart device 110. Through the language processing protocols, the communication client 128 may provide a substantially similar experience in holding a conversation in the communication session with the user of the smart device 110.

The communication client 128 may further be configured to simulate the agent in continuing the communication session. For example, as a result of the transfer being seamless without intervention (e.g., permission) from the user of the smart device 110, the communication client 128 may utilize substantially similar syntax and conversing patterns so that the user may be unaware that the transfer to the bot program 126 has occurred. In another example, the communication client 128 may be configured to mimic a voice and speaking pattern of the agent so that the user may again be unaware that the transfer to the bot program 126 has occurred. As a result of the transfer being known to the user of the smart device 110, the communication client 128 may utilize a default conversing and/or speaking pattern.

The bot program 126 may also be configured to determine actions to be taken based on an identified task to be performed. The bot program 126 may be configured with scripted actions when the task has been positively identified. Based on a current progression of the communication session in completing the task, when the bot program 126 takes over the communication session, the bot program 126 may provide the user with a step-by-step process in completing the task. Based on the task to be completed, the bot program 126 may be configured with each process to perform corresponding actions and/or provide corresponding conversation responses and/or queries.

In the exemplary embodiments, the transfer server 130 may include a transfer program 132 and act as a server in a client-server relationship with the communication client 112, the communication client 124, and the communication client 128. The transfer server 130 may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of receiving and sending data to and from other computing devices. While the transfer server 130 is shown as a single device, in other embodiments, the transfer server 130 may be comprised of a cluster or plurality of computing devices, working together or working independently. While the transfer server 130 is also shown as a separate component, in other embodiments, the operations performed by the transfer server 130 may be incorporated with one or more of the other components of the communication transfer system 100. For example, the transfer server 130 may be incorporated in the contact center 120. The transfer server 130 is described in greater detail as a hardware implementation with reference to FIG. 3, as part of a cloud implementation with reference to FIG. 4, and/or as utilizing functional abstraction layers for processing with reference to FIG. 5.

In the exemplary embodiments, the transfer program 132 may be a software, hardware, and/or firmware application configured to determine how to allow a communication session to proceed. In determining the manner with which the communication session is to proceed, the transfer program 132 may determine whether to maintain the communication session between the agent of the agent device 122 and the user of smart device 110 or to transfer the communication session from the agent of the agent device 122 to the bot program 126 so that the communication continues between the bot program 125 and the user of the smart device 110. To determine whether to transfer the communication session, the transfer program 132 may monitor a progress of the communication session. For example, the transfer program 132 may determine a direction that the communication session is heading. The transfer program 132 may be configured to automatically determine the task that is being requested by the user of the smart device 110 based on the monitoring of the communication session. As the agent may enter queries and/or responses in the communication session directed toward identification of the task, the transfer program 132 may have access to more pertinent information and be capable of identifying the task to be performed in a more definitive manner (e.g., in contrast to an entirely automated approach where a bot must steer the conversation toward identification of the task as used by conventional approaches).

Upon identification of the task that is being requested by the user of the smart device 110, the transfer program 132 may determine one or more cost values. For example, as noted above, scripted actions in completing the task by the bot program 126 may achieve cost reductions of the contact center 120. In identifying the series of scripted steps to complete the task, the portions of the conversation in the communication session may be easily within the capabilities of the bot program 126. For example, a conversation in which a mailing address must be entered to receive a replacement part may only provide a modest efficiency gain in having the bot program 126 capture this information for a single conversation. However, in view of the volume of communication sessions that occur at the contact center 120 that may further be directed to this step in task completion, the gains across these communication sessions may be substantial. In another example, a task may relate to a multi-minute cable check and router reboot to complete the task. Rather than having the agent wait for this process to complete, the bot program 126 may be tasked with performing these steps. Having the bot program 126 step the user of the smart device 110 through these steps may save the agent considerable time for each communication session and cumulatively, lead to substantial cost savings for the contact center 120.

The exemplary embodiments may utilize various ways of estimating costs and benefits to transferring the communication session from the agent to the bot program 126. For example, once a task is identified (e.g., which is often expressed or at least implied with some certainty in the first or second user utterance or identified by the agent), the transfer program 132 may estimate the cost by averaging the path lengths (e.g., steps of a process corresponding to the task) leading to a successful outcome (e.g., a solution or solutions to a particular technical problem). In another example, the transfer program 132 may determine a clock time taken in previous successful communication sessions in resolving a substantially similar task which is captured and averaged. In a further example, the transfer program 132 may determine estimated benefits of continuing to a successful conversational outcome (e.g., the proportion of conversations that are marked or otherwise rated positively by previous users may be used). In a further example, the transfer program 132 may estimate the benefits of continuing the conversation through the use of external measures (e.g., the proportion of conversations that led a user to a desired measurable state), such as repairing a user's internet connection at the end of a conversation in which the user was walked though steps to fix a broken connection.

In an example of a cost value, the transfer program 132 may determine a continuing conversation utility value that indicates a cost of continuing the communication session between the agent of the agent device 122 and the user of the smart device 110. The continuing conversation utility value may be determined according to a complexity of the task that is being requested based on the path lengths of steps in a process, a clock time that may be required, estimated benefits, etc. As a complexity of the task that is being requested increases, there may be cost considerations that warrant continuing the communication session with the agent. For example, the request may involve a plurality of different processes that interact with one another and utilizes results from the different processes in completion of an overall task. The transfer program 132 may determine whether the continuing conversation utility value is at least a minimum continuing threshold based on a predicted continuing benefit (e.g., according to a cost analysis). As a result of the continuing conversation utility value being at least the minimum continuing threshold, the transfer program 132 may determine that the communication session is to continue between the agent and the user. As a result of the continuing conversation utility value being less than the minimum continuing threshold, the transfer program 132 may determine that the communication session is to be transferred from the agent to the bot program 126.

In another example of a cost value, the transfer program 132 may determine a transferring conversation utility value that indicates a cost of transferring the communication session from the agent of the agent device 122 to the bot program 126. The transferring conversation utility value may be determined according to an ease of utilizing the bot to complete the task that is being requested based on the path lengths of steps in a process, a clock time that may be required, estimated benefits, etc. As an ease of the task that is being requested increases, there may be cost considerations that warrant transferring the communication session from the agent to the bot program 126. For example, the request may involve only one process to complete the task. The transfer program 132 may determine whether the transferring conversation utility value is at least a minimum transferring threshold based on a predicted transferring benefit (e.g., according to a cost analysis). As a result of the transferring conversation utility value being at least the minimum transferring threshold, the transfer program 132 may determine that the communication session is to be transferred from the agent to the bot program 126. As a result of the transferring conversation utility value being less than the minimum transferring threshold, the transfer program 132 may determine that the communication session is to be maintained between the agent and the user.

In a further example of the cost value, the transfer program 132 may utilize both the continuing conversation utility value and the transferring conversation utility value to determine whether to maintain a current state of the communication session between the agent and the user or to transfer the communication session to continue using the bot program 126 instead of the agent. Although the continuing conversation utility value and the transferring conversation utility value may provide indications that fall hand-in-hand, there may be instances where the satisfaction of one utility value (e.g., transfer should occur) conflicts with the other utility value (e.g., communication session should continue as is with the agent). For example, the complexity may not rise to a degree that the agent may be required to continue the communication session but the ease for the bot program 126 may not be at a sufficient level to warrant use of the bot program 126. Accordingly, the transfer program 132 may be configured to determine when both the continuing conversation utility value and the transferring conversation utility value satisfy the minimum continuing threshold and the minimum transferring threshold, respectively, to determine whether to transfer the communication session from the agent to the bot program 126. In a particular exemplary implementation, the transfer program 132 may consider the predicted continuing benefit (e.g., based on the analysis of the continuing conversation utility value), the predicted transferring benefit (e.g., based on the analysis of the transferring conversation utility value), or a combination thereof. Based on the predicted continuing benefit and the predicted transferring benefit, the transfer program 132 may determine an overall benefit in continuing the communication session in the current state between the agent and the user or in transferring the communication session from the agent to the bot. For example, as a result of the predicted continuing benefit being greater than the predicted transferring benefit, the transfer program 132 may determine that the communication session is to remain with the agent. As a result of the predicted transferring benefit being greater than the predicted continuing benefit, the transfer program 132 may determine that the communication session is to be transferred from the agent to the bot.

The transfer program 132 may be configured to directly communicate with the agent of the agent device 122 via the communication client 124, directly communicate with the user of the smart device 110 via the communication client 112, and/or communicate indirectly to the user of the smart device 110 via instruction with a conversation action through the communication client 124. For example, when the transfer program 132 determines that a transfer from the agent to the bot program 126 is to be performed, the transfer program 132 may provide an indication to the agent that the bot program 126 will be taking over the communication session. The indication may be invisible to the user for a seamless transfer to occur. In this manner, the bot program 125 may seamlessly intercept the communication session from the agent. In another example, when the transfer program 132 determines that a transfer may be more cost efficient, the transfer program 132 may transmit a request to the user of the smart device 110 regarding whether the communication session may be transferred to the bot program 126. The request may be transmitted directly to the user of the smart device 110 via the communication client 112 or indirectly through a conversation action in the communication session via the communication client 124 of the agent device 122. The transfer program 132 may receive a response from the user (e.g., the user enters a conversation action in the communication session approving or disapproving of the transfer) and proceed according to the selected response.

When transmitting the request to the user of the smart device 110, the transfer program 132 may include an incentive for the user to select the transfer to the bot program 126. For example, there may be a user of the smart device 110 who wishes to always remain connected to the agent. However, by incentivizing the transfer to the bot program 126, the user may select to use the bot program 126 to more efficiently complete the task for the user while reducing costs of the contact center 120. Based on the above described cost values and the paths that may be used by the bot program, the transfer program 132 may indicate an optimistic incentive calculation to the user of the smart device 110. For example, the optimistic incentive calculation may be a percentage success rate and a duration that may be required to complete the task at a current state of the communication session.

Through the above mechanisms, the transfer program 132 may be configured to utilize both the estimation of utilities that are used and the manner in which the estimation may be expressed to lure a user away from the agent to the bot program 126. In each communication session, the exemplary embodiments may be performed toward the goal of maximizing the efficiency of the overall conversation from both the user's perspective and the contact center's perspective. The transfer program 132 may also be configured to adjust the degree of optimism being expressed to the user to encourage the user to accept the transfer to the bot program 126 if the transfer is not done automatically without intervention from the user (e.g., accepting a request to transfer the communication session).

As noted above, the exemplary embodiments may also be configured to transfer the communication session back to the original agent or a different agent who is equipped to handle further tasks. For example, upon completion of a previously identified task, based on a response to a query that asks whether the user is satisfied with the current task completion, based on a response to a query asking if there is anything further, etc., the transfer program 132 may determine whether the communication session is better suited to be handled by an agent rather than continuing with the bot program 126. Again, the exemplary embodiments may utilize any mechanism that determines whether the communication session is to be transferred back to an agent. When the communication session is again between the agent and the user, the exemplary embodiments may be used to monitor a progress of the communication session while a conversation is had between the agent and the user to make any determination with regard to transferring the communication session to the bot program 126.

Figure 2:
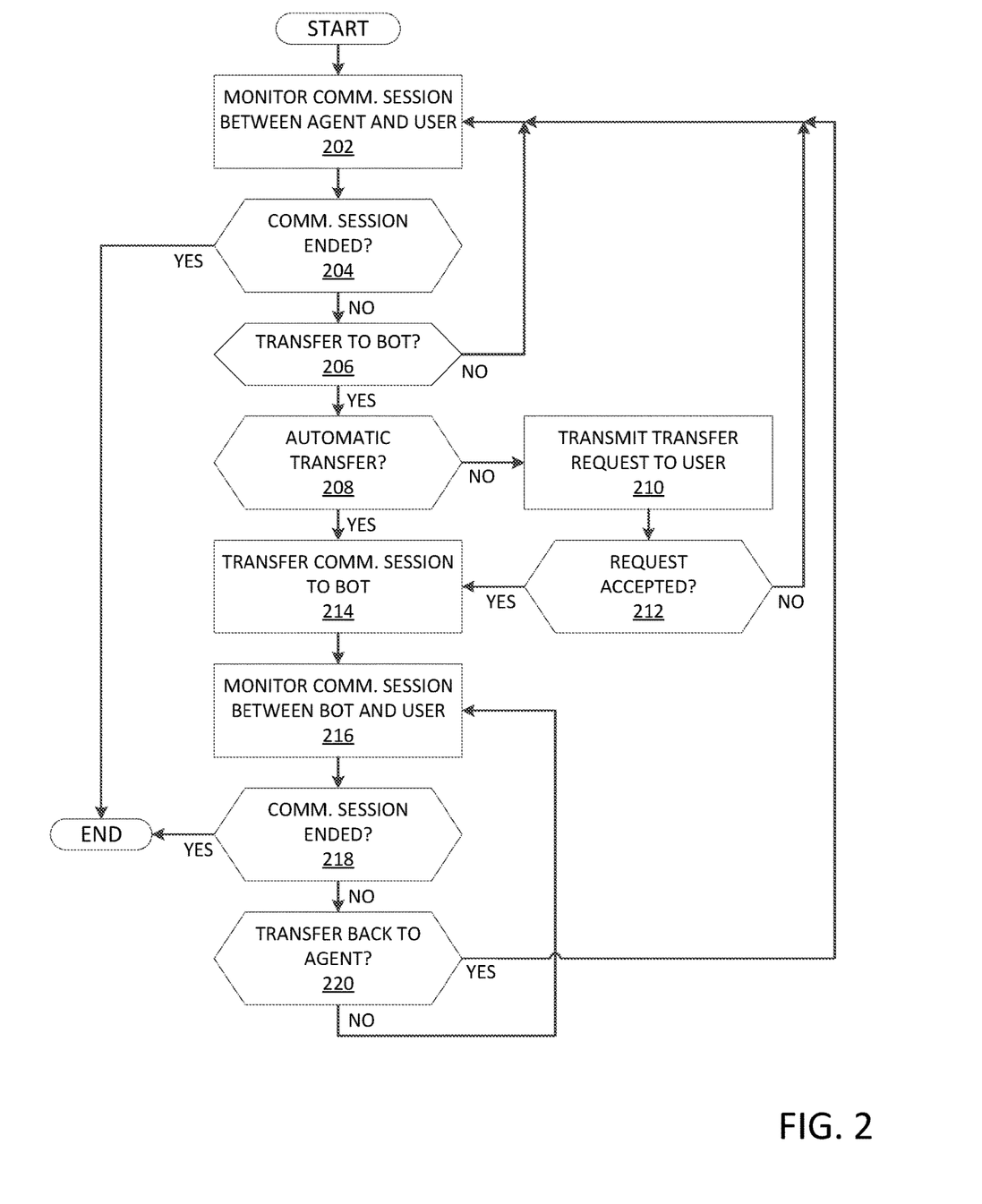
FIG. 2 depicts an exemplary flowchart of a method illustrating the operations of a transfer program 132 of the communication transfer system 100 in determining when to transfer a communication session from an agent to a bot, in accordance with the exemplary embodiments.

FIG. 2 illustrates an exemplary flowchart of a method 200 illustrating the operations of the transfer program 132 of the communication transfer system 100 in determining when to transfer a communication session from an agent to a bot, in accordance with the exemplary embodiments.

For purposes of the following description, the method 200 may assume that a communication session is already underway between an agent utilizing the agent device 122 via the communication client 124 and a user utilizing the smart device 110 via the communication client 112. For example, the contact center 120 may be configured to initiate the communication session using the agent to begin identifying the task that is being requested. Through this opposite approach relative to conventional approaches, the agent may be more adept at determining the actual task being requested by the user while taking advantage of how the bot program 126 may be more efficient in handling portions of the conversation that follow after the task has been identified (e.g., following scripted steps toward completion of the task). The method 200 being described with the communication session at a state where the agent initiates the communication session with the user is only exemplary. The method 200 may also be applicable to any time during the communication session where the participants are the agent and the user. For example, there may have been a transfer of the communication session back to the original agent. Thus, while the communication session between the agent and the user progresses, the exemplary embodiments may be utilized.

The transfer program 132 may monitor the communication session between the agent of the agent device 122 and the user of the smart device 110 (step 202). The contact center 120 may route an incoming communication request from the user of the smart device 110 to an available one of the agents in the contact center 120. In this manner, the communication session may begin with the agent rather than the bot program 126. The agent and the user may each provide one or more utterances to ascertain the purpose of the user reaching out to the contact center 120.

To further illustrate the operations of the delegation program 134, reference is now made to an illustrative exemplary embodiment. According to the illustrative exemplary embodiment, the user may have a product that is sold by a company associated with the contact center 120. The user may have purchased the product with a warranty and may wish to determine whether the warranty is still valid and/or whether the warranty may be used with an issue with the product. As a result of the communication session being established, the agent may ask the user the task that is being requested and exchange utterances with the user.

In monitoring the communication session, the transfer program 132 may determine whether the communication session has ended (decision 204). For a variety of reasons, the user or the agent may conclude the communication session. As a result of the communication session continuing (decision 204, "NO" branch), the transfer program 132 may determine whether the communication session should be transferred from the agent to the bot program 126 (decision 206). As described above, the transfer program 132 may utilize one or more cost determinations (e.g., a continuing conversation utility value, a transferring conversation utility value, a combination thereof, etc.) based on a variety of types of costs (e.g., estimate of cost based on averaging path lengths, an amount of time that is required, estimated benefits, etc.). As a result of the transfer program 132 determining that the communication session is to remain with the agent (decision 206, "NO" branch), the transfer program 132 may allow the communication session to continue with the agent and continue monitoring the communication session. As a result of the transfer program 132 determining that the communication session is to be transferred from the agent to the bot program 126 (decision 206, "YES" branch), the transfer program 132 may continue processing the transfer.

According to the previously introduced exemplary embodiment, the transfer program 132 may determine that the determination of whether a warranty is available involves a set of identifiable steps that may be performed by the bot program 126. Accordingly, the transfer program 132 may determine a continuing conversation utility value as well as a transferring conversation utility value in transferring the communication session. The transfer program 132 may utilize a basis in which both of the utility values are to be satisfied to warrant a transfer of the communication session. The transfer program 132 may determine that the utility values are both satisfied and determine that the communication session is to be transferred.

As a result of the communication session being determined to be transferred from the agent to the bot, the transfer program 132 may determine whether the transfer is to be performed automatically without intervention from the user of the smart device 110 (decision 208). As described above, the transfer program 132 may transfer the communication session in an invisible manner from the perspective of the user of the smart device 110. Alternatively, the transfer program 132 may transfer the communication session based on a response to a request to transfer the communication session that is transmitted to the user of the smart device 110. Thus, as a result of the transfer being automatic and invisible to the user of the smart device 110 (decision 208, "YES" branch), the transfer program 132 may transfer the communication session to the bot program 132 without requiring approval from the user of the smart device 110 (step 214). As a result of the transfer requiring approval (decision 208, "NO" branch), the transfer program 132 may transmit a request to the user of the smart device 110 querying whether the communication session may be transferred (step 210). The transfer program 132 may be configured to transmit the request with an incentive such as including information regarding a likely success rate and/or a remaining time to complete the task. The transfer program 132 may determine whether the request has been accepted (decision 212). As a result of the request being accepted (decision 212, "YES" branch), the transfer program 132 may transfer the communication session from the agent to the bot program 126 (step 214). As a result of the request being denied (decision 212, "NO" branch), the transfer program 132 may continue the communication session with the agent.

With reference again to the previously introduced exemplary embodiment, the contact center 120 may utilize an approval mechanism to transfer the communication session from the agent to the bot program 126. Accordingly, the transfer program 132 may transmit a request to the user of the smart device 110 querying whether the communication session may be transferred to the bot program 126. The transfer program 132 may provide a relative success rate in using the bot program 126 to complete the task as well as an estimated amount of time that may be required. Based on this incentive, the user of the smart device 110 may approve the transfer of the communication session from the agent to the bot program 126.

As a result of the communication session being transferred from the agent to the bot program 126, the transfer program 132 may monitor the communication session that is now between the bot program 126 and the user of the smart device 110 (step 216). While monitoring the communication session at this stage, the transfer program 132 may determine whether the communication session has ended (decision 218). For example, the bot program 126 may perform steps that completes the task being requested by the user of the smart device 110. As a result of the communication session continuing (decision 218, "NO" branch), the transfer program 132 may determine whether the communication session is to remain with the bot program 126 or whether the communication session is to be transferred back to the agent or a different agent (decision 220). The method 200 may incorporate any mechanism to determine whether the communication session is to be transferred from the bot program 126 to the agent. As a result of the communication session being determined to remain with the bot program 126 (decision 220, "NO" branch), the transfer program 132 may continue to monitor the communication session between the bot program 126 and the user of the smart device 110. As a result of the communication session being determined to be transferred back to the agent (decision 220, "YES" branch), the transfer program 132 may transfer the communication session to the agent and continue monitoring the communication session that is now between the agent and the user of the smart device 110.

Referring now to the previously introduced, illustrative exemplary embodiment, the user may follow the steps that are identified towards completion of the identified task. For example, the bot program 126 may request that the user provide a serial number of the product in question. The user of the smart device 110 may provide this information. If the user of the smart device 110 cannot provide this information, the bot program 126 may request other information that may be used in completion of the task. The bot program 126 may then identify the warranty in question and determine whether the warranty may be used for the reason indicated by the user of the smart device 110. The user of the smart device 110 may receive the information and may require nothing further. Accordingly, the communication session may end.

In an alternative path, the user may not have the serial number or supply enough information that allows the bot program 126 to determine the warranty in question. In monitoring a progress of the communication session between the user of the smart device 110 and the bot program 126, the transfer program 132 may determine that the communication session should be transferred back to the agent to attempt to complete the task through a more complicated set of steps involving various inputs and queries to the user of the smart device 110. Thus, the transfer program 132 may contact the original agent or a further agent who is better equipped to handling a current state of the communication session.

The exemplary embodiments may include a variety of features that may be used in processing communication sessions with the user of the smart device 110. In a first exemplary scenario for a transition from an agent to a bot, the transfer program 132 may transfer the communication session based on a pre-programmed script or based on a utility calculation. For example, the user of the smart device 110 may reach out to the contact center 120 and connect with an agent. The user may request a check on a serial number for a product (e.g., for a dishwasher purchased from a company associated with the contact center 120). The agent may query the user for the type of product (e.g., production company name). The user may provide a make for the product. The transfer program 132 may determine that the communication session should be transferred to the bot program 126 (e.g., based on a utility calculation). Thus, the transfer program 132 may provide an indication to the agent that is invisible to the user that the bot program 126 will be intercepting the communication session. The bot program 126 may then perform one or more steps that requests the serial number of the product from the user. The bot program 126 may determine the model number and a purchase date which is provided to the user. The user may then ask whether the product is still under warranty. The bot program 126 may determine whether the warranty is still valid or not and provide this information including, for example, an expiration date of the warranty. The bot program 126 may ask whether the process has resolved the task being requested and conclude the communication session when no further tasks are requested.

In a second exemplary scenario for a transition from an agent to a bot, the transfer program 132 may transfer the communication session based on the transfer being offered to the user according to an optimistic incentive calculation. For example, as a result of the communication session being determined to be transferred to the bot program 126, the transfer program 132 may converse with the user of the smart device 110 via the communication client 124 of the agent device 122 requesting the transfer with an incentive including a success rate and a time to completion of the task. The user may accept the proposition for the transfer upon which the transfer program 132 transfers the communication session to the bot program 126. The bot program 126 may then proceed in a substantially similar manner described above in the first exemplary scenario.

In a third exemplary scenario for a transition from an agent to a bot, the transfer program 132 may transfer the communication session based on the transfer being intercepted according to a utility calculation followed by a hand-back to a different agent based on a utility calculation. For example, the transfer program 132 may transfer the communication session from the agent to the bot program 126 in a manner substantially similar to the first exemplary scenario. The communication session between the bot program 126 and the user may also proceed in a substantially similar manner except that the user may request another task. For example, the user may query whether the warranty may be extended. In determining the appropriate utility value (e.g., the potential steps may be too varied for the bot program 126 to efficiently process the task), the transfer program 132 may request that a further agent who is equipped to handle the task be transferred the communication session. The further agent may then continue the communication session with the user of the smart device 110.

In a fourth exemplary scenario for a transition from an agent to a bot, the transfer program 132 may transfer the communication session based on an optional transfer while waiting for an agent based on a utility calculation. For example, the transfer program 132 may be configured to instruct the bot program 126 to relay a transfer option. The transfer option may be provided to the user at a variety of times (e.g., at any time the communication session is with the bot program 126, after the communication session has been transferred to the bot program 126 a predetermined number of times, etc.). In the fourth exemplary scenario, the user may have conversed with the bot program 126, then an agent, and back with the bot program 126. At this stage, the transfer program 132 may instruct the bot program 126 to allow the user to provide a command (e.g., writing AGENT for text based communication sessions, uttering AGENT for voice based communication sessions, etc.) that automatically transfers the communication session to the agent. The transfer program 132 may also provide a further command to allow the communication session to be transferred from an agent to the bot program 126.

The exemplary embodiments are configured to determine when to transfer a communication session from an agent to a bot. In contrast to a conventional approach in transferring a communication session from a bot to an agent, the exemplary embodiments may transfer the communication session from the agent to the bot. By taking advantage of a more efficient approach in the agent identifying or providing/requesting information directed toward identifying the task being requested and utilizing a bot to perform scripted actions in completing the task, the exemplary embodiments may determine when to transfer the communication session from the agent to the bot to increase an efficiency of the contact center while also decreasing associated costs of the contact center, particularly with employing agents.

Figure 3:
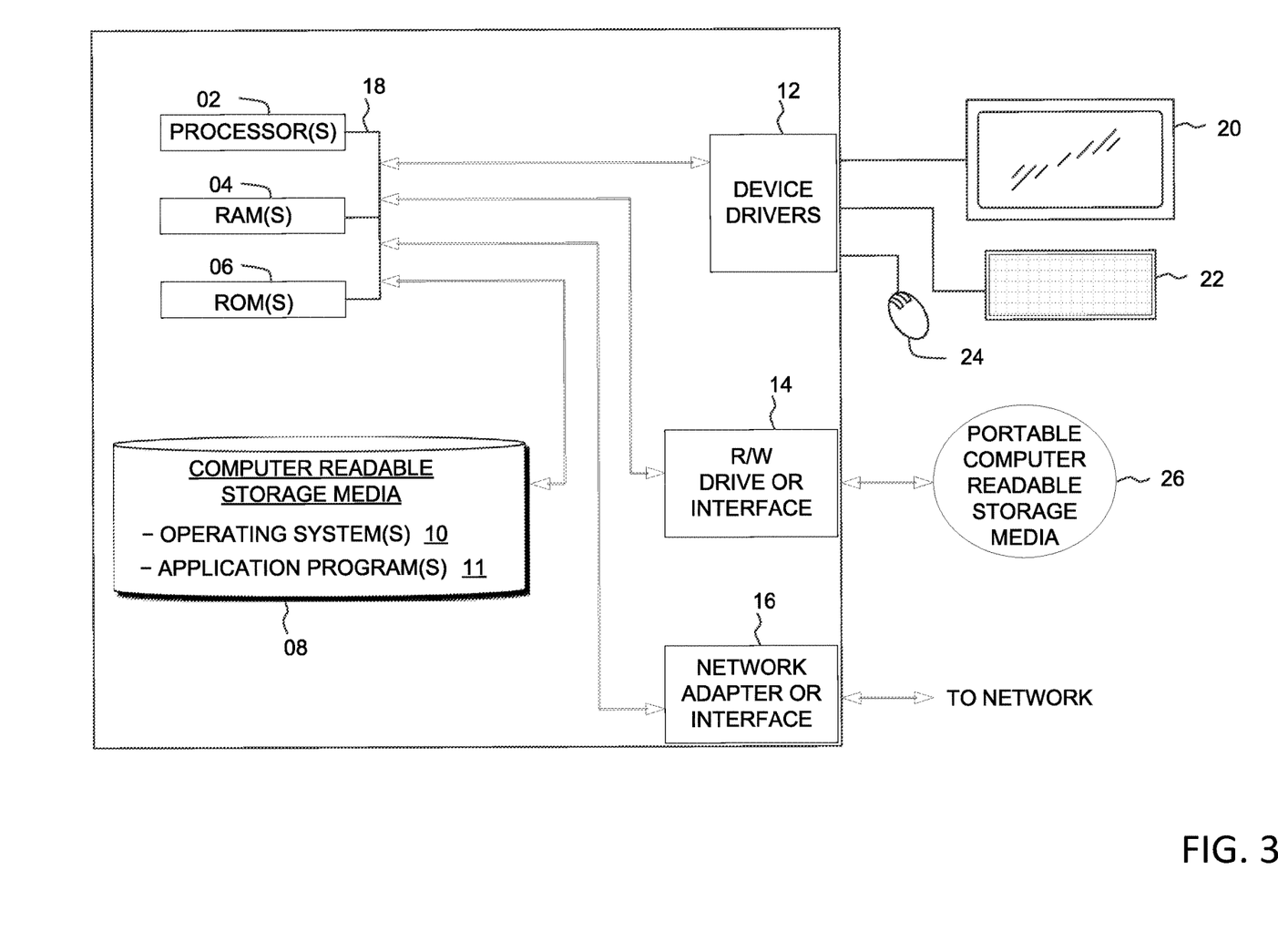
FIG. 3 depicts an exemplary block diagram depicting the hardware components of the communication transfer system 100 of FIG. 1, in accordance with the exemplary embodiments.

FIG. 3 depicts a block diagram of devices within the communication transfer system 100 of FIG. 1, in accordance with the exemplary embodiments. It should be appreciated that FIG. 3 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
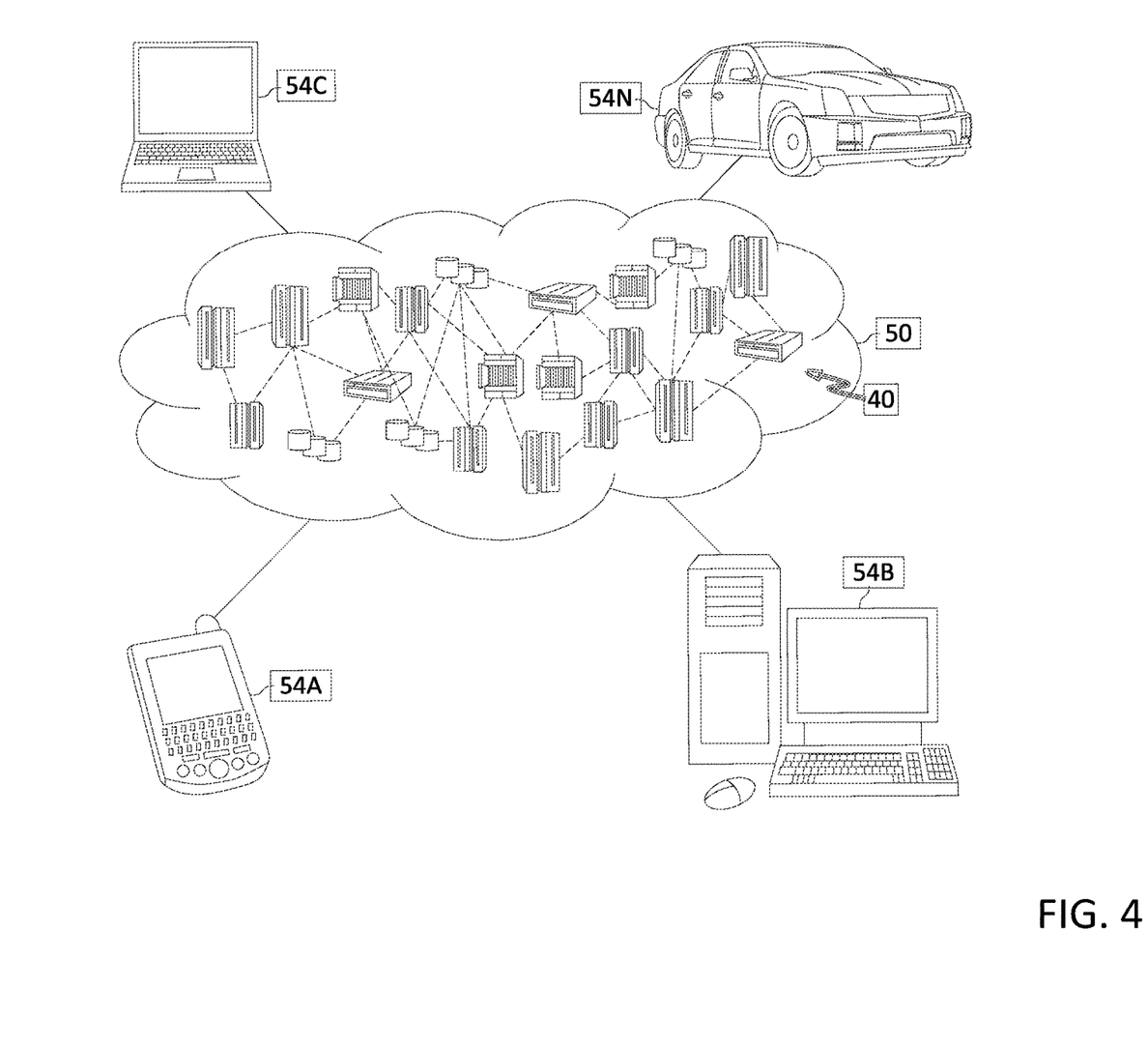
FIG. 4 depicts a cloud computing environment, in accordance with the exemplary embodiments.

Referring now to FIG. 4, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 40 and cloud computing environment 50 can communicate with any type of computerized device over any type of network and/or network addressable connection (e.g., using a web browser).

Figure 5:
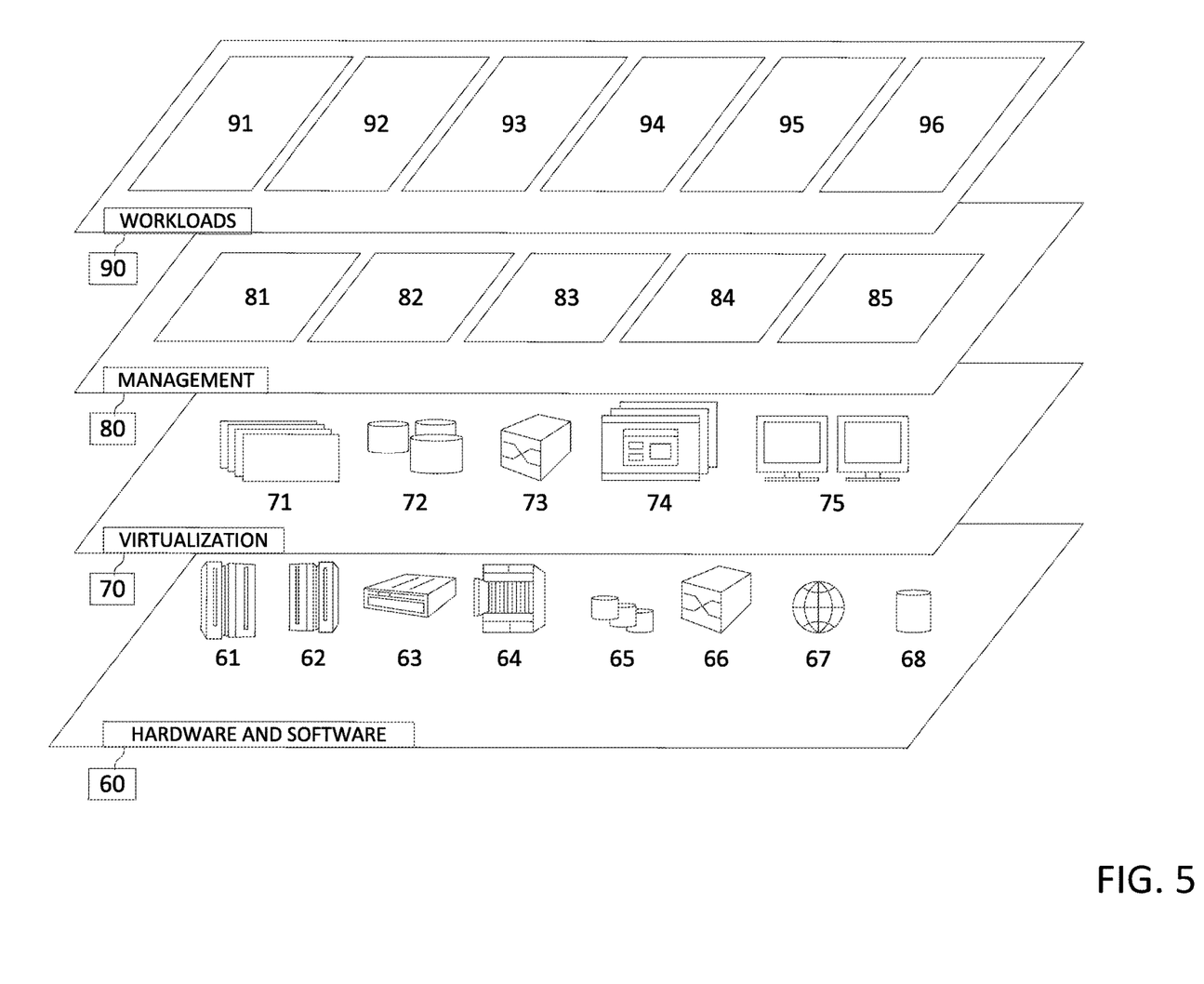
FIG. 5 depicts abstraction model layers, in accordance with the exemplary embodiments.

Referring now to FIG. 5, a set of functional abstraction layers provided by cloud computing environment 50 (FIG. 4) is shown. It should be understood in advance that the components, layers, and functions shown in FIG. 5 are intended to be illustrative only and the exemplary embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and transfer processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for determining when to transfer a communication session from an agent to a bot, the method comprising:
    monitoring the communication session between the agent and a user in resolving a task;
    determining a continuing utility value indicating a predicted continuing cost to maintaining the communication session with the agent, the continuing utility value being indicative of a predicted continuing benefit to maintaining the communication with the agent, the continuity utility value being determined based on path lengths of steps used in leading to a successful outcome for the task by the agent;
    determining a transferring utility value indicating a predicted transferring cost to transferring the communication session from the agent to the bot, the transferring utility value being indicative of a predicted transferring benefit to transferring the communication session from the agent to the bot, the transferring utility value being determined based on further path lengths of further steps used in leading to a successful outcome for the task by the bot;
    as a result of the continuing utility value satisfying a continuing threshold to maintain the communication with the agent and the transferring utility value satisfying a transferring threshold to transfer the communication session from the agent to the bot, comparing the continuing utility value with the transferring utility value; and
    as a result of the predicted transferring benefit being greater than the predicted continuing benefit, transferring the communication session from the agent to the bot.

2. The computer-implemented method of claim 1, further comprising:
    determining a task being requested by the user based on the monitoring of the communication session.

3. The computer-implemented method of claim 2, wherein the continuing utility value, the transferring utility value, or both are determined based on a process in completing the task.

4. The computer-implemented method of claim 1, wherein the predicted continuing cost, the predicted transferring cost, or both are further based on a clock time taken in previous communication sessions, external measures estimating at least one of the predicted continuing benefit and the predicted transferring benefit, or a combination thereof.

5. The computer-implemented method of claim 1, further comprising:
    transmitting a request to the user requesting that the communication session be transferred from the agent to the bot; and
    receiving a response to the request,
    wherein the communication session is transferred from the agent to the bot based on the response.

6. The computer-implemented method of claim 1, wherein the communication session is transferred automatically and invisible to the user.

7. The computer-implemented method of claim 6, further comprising:
    generating an indication indicating that the communication session is to be transferred to the bot; and
    transmitting the indication to the agent.

8. A computer program product for determining when to transfer a communication session from an agent to a bot, the computer program product comprising:
    one or more non-transitory computer-readable storage media and program instructions collectively stored on the one or more non-transitory computer-readable storage media capable of performing a method, the method comprising:
        monitoring the communication session between the agent and a user;
        determining a continuing utility value indicating a predicted continuing cost to maintaining the communication session with the agent, the continuing utility value being indicative of a predicted continuing benefit to maintaining the communication with the agent, the continuity utility value being determined based on path lengths of steps used in leading to a successful outcome for the task by the agent;
        determining a transferring utility value indicating a predicted transferring cost to transferring the communication session from the agent to the bot, the transferring utility value being indicative of a predicted transferring benefit to transferring the communication session from the agent to the bot, the transferring utility value being determined based on further path lengths of further steps used in leading to a successful outcome for the task by the bot;
        as a result of the continuing utility value satisfying a continuing threshold to maintain the communication with the agent and the transferring utility value satisfying a transferring threshold to transfer the communication session from the agent to the bot, comparing the continuing utility value with the transferring utility value; and as a result of the predicted transferring benefit being greater than the predicted continuing benefit, transferring the communication session from the agent to the bot.

9. The computer program product of claim 8, wherein the method further comprises:

determining a task being requested by the user based on the monitoring of the communication session.

10. The computer program product of claim 9, wherein the continuing utility value, the transferring utility value, or both are determined based on a process in completing the task.

11. The computer program product of claim 8, wherein the predicted continuing cost, the predicted transferring cost, or both are further based on a clock time taken in previous communication sessions, external measures estimating at least one of the predicted continuing benefit and the predicted transferring benefit, or a combination thereof.

12. The computer program product of claim 8, wherein the method further comprises:

transmitting a request to the user requesting that the communication session be transferred from the agent to the bot; and receiving a response to the request, wherein the communication session is transferred from the agent to the bot based on the response.

13. The computer program product of claim 8, wherein the communication session is transferred automatically and invisible to the user.

14. The computer program product of claim 13, wherein the method further comprises:

generating an indication indicating that the communication session is to be transferred to the bot; and transmitting the indication to the agent.

15. A computer system for determining when to transfer a communication session from an agent to a bot, the computer system comprising:

one or more computer processors, one or more computer-readable storage media, and program instructions collectively stored on the one or more of the computer-readable storage media for execution by at least one of the one or more processors capable of performing a method, the method comprising:

monitoring the communication session between the agent and a user;

determining a continuing utility value indicating a predicted continuing cost to maintaining the communication session with the agent, the continuing utility value being indicative of a predicted continuing benefit to maintaining the communication with the agent, the continuity utility value being determined based on path lengths of steps used in leading to a successful outcome for the task by the agent;

determining a transferring utility value indicating a predicted transferring cost to transferring the communication session from the agent to the bot, the transferring utility value being indicative of a predicted transferring benefit to transferring the communication session from the agent to the bot, the transferring utility value being determined based on further path lengths of further steps used in leading to a successful outcome for the task by the bot;

as a result of the continuing utility value satisfying a continuing threshold to maintain the communication with the agent and the transferring utility value satisfying a transferring threshold to transfer the communication session from the agent to the bot, comparing the continuing utility value with the transferring utility value; and as a result of the predicted transferring benefit being greater than the predicted continuing benefit, transferring the communication session from the agent to the bot.

16. The computer system of claim 15, wherein the method further comprises:

determining a task being requested by the user based on the monitoring of the communication session.

17. The computer system of claim 16, wherein the continuing utility value, the transferring utility value, or both are determined based on a process in completing the task.

18. The computer system of claim 15, wherein the predicted continuing cost, the predicted transferring cost, or both are further based on a clock time taken in previous communication sessions, external measures estimating at least one of the predicted continuing benefit and the predicted transferring benefit, or a combination thereof.

19. The computer system of claim 18, wherein the method further comprises:

transmitting a request to the user requesting that the communication session be transferred from the agent to the bot; and receiving a response to the request, wherein the communication session is transferred from the agent to the bot based on the response.

20. The computer system of claim 15, wherein the communication session is transferred automatically and invisible to the user.

* * * * *